(12) United States Patent
Shao et al.

(10) Patent No.: US 9,414,618 B2
(45) Date of Patent: Aug. 16, 2016

(54) INFANT FORMULA MILK POWDER AND PREPARATION METHOD THEREOF

(71) Applicant: ZHEJIANG CANOBANK HEALTH PRODUCT CO., LTD., Hangzhou (CN)

(72) Inventors: Shengrong Shao, Hangzhou (CN); Gangliang Hu, Hangzhou (CN); Qingzhong Lv, Hangzhou (CN); Jun Sun, Hangzhou (CN); Zhiyue Wu, Hangzhou (CN); Liangmei Xie, Hangzhou (CN)

(73) Assignee: Zhejiang Canobank Health Product Co., Ltd. (CN)

( * ) Notice: Subject to any disclaimer, the term of this patent is extended or adjusted under 35 U.S.C. 154(b) by 0 days.

(21) Appl. No.: 14/402,639

(22) PCT Filed: May 24, 2013

(86) PCT No.: PCT/CN2013/076225
§ 371 (c)(1),
(2) Date: Nov. 20, 2014

(87) PCT Pub. No.: WO2013/174306
PCT Pub. Date: Nov. 28, 2013

(65) Prior Publication Data
US 2015/0140174 A1    May 21, 2015

(30) Foreign Application Priority Data
May 24, 2012 (CN) .......................... 2012 1 0169746

(51) Int. Cl.
| | | |
|---|---|---|
| *A23L 1/304* | (2006.01) | |
| *A23L 1/29* | (2006.01) | |
| *A23L 1/302* | (2006.01) | |
| *A23L 1/305* | (2006.01) | |

(52) U.S. Cl.
CPC .................. *A23L 1/296* (2013.01); *A23L 1/302* (2013.01); *A23L 1/304* (2013.01); *A23L 1/305* (2013.01); *A23V 2002/00* (2013.01); *A23V 2200/00* (2013.01)

(58) Field of Classification Search
CPC ............ A23V 2250/1592; A23V 2250/54248; A23V 2250/708
USPC ...................... 426/72, 74, 519, 648, 656, 801
See application file for complete search history.

(56) References Cited

U.S. PATENT DOCUMENTS

| | | | |
|---|---|---|---|
| 2005/0129738 A1 | 6/2005 | Rutenberg | |
| 2012/0114758 A1* | 5/2012 | Rea | A23L 1/296 424/490 |
| 2015/0237902 A1* | 8/2015 | Rosado Loria | A23L 1/302 514/5.6 |

FOREIGN PATENT DOCUMENTS

| | | |
|---|---|---|
| CN | 101061819 A | 10/2007 |
| CN | 101766225 A | 7/2010 |
| CN | 102283289 A | 12/2011 |
| CN | 102696760 A | 10/2012 |
| JP | 2002-306125 A | 10/2002 |

OTHER PUBLICATIONS

ColostOferrin (TM), Product Data sheet, Douglas Laboratory, pp. 1, and 2, 2013.*
International Search Report regarding Application No. PCT/CN2013/076225, mail date Aug. 22, 2013, 3 pages.

* cited by examiner

*Primary Examiner* — Helen F Heggestad
(74) *Attorney, Agent, or Firm* — Foley & Lardner LLP

(57) ABSTRACT

The present invention relates to an infant formula milk powder capable of preventing and alleviating infant iron deficiency anemia and a preparation method thereof. The formula milk powder comprises components such as vegetable oil, fresh milk, whey powder, lactose powder, whey protein powder, oligosaccharides, complex vitamins and complex minerals, wherein the lactoferrin and vitamin C, or alternatively, an iron source (calculated as iron), lactoferrin and vitamin C are maintained in the appropriate mass ratios, and the formula milk powder of the present invention is obtained by performing mixing, homogenizing, cooling, concentrating and spray-drying, packaging or directly using a step-by-step mixing method. The formula milk powder comprises appropriate amounts of vitamin C and lactoferrin, as well as an appropriate amount of iron source as further provided, and the three are combined according to an appropriate proportion, so that the combination of the three kinds of the substances have a synergistic effect, and the absorption and utilization rate of iron are increased dramatically, thereby not only achieving the desirable iron supplementation effect, but also preventing and alleviating the phenomenon of infant iron deficiency anemia.

16 Claims, No Drawings

INFANT FORMULA MILK POWDER AND PREPARATION METHOD THEREOF

CROSS-REFERENCE TO RELATED PATENT APPLICATIONS

The present application is a U.S. national stage of and claims priority to and the benefit of International Application No. PCT/CN2013/076225, filed May 24, 2013, which claims the benefit of Chinese Application No. 201210169746.6, filed May 24, 2012, both of which are incorporated herein by reference in their entirety.

FIELD OF THE INVENTION

The present invention relates to the field of dairy processing, and specifically to an infant formula milk powder capable of preventing and alleviating infant iron deficiency anemia and a preparation method thereof.

BACKGROUND OF THE INVENTION

Iron is a kind of essential trace element which is the most abundant in the human body, and is involved in multiple biological functions, such as substance metabolism, production of red blood cell, cell division and the like. However, iron deficiency is one of the most important nutritional problems in the world, particularly in developing countries, and iron deficiency is an important reason for the occurrence of anemia.

In 1928, Mackay firstly proved that the iron deficiency is the reason for anemia being prevailed in infants; in 1982, Bunge noted that infants are susceptible to iron deficiency. The incidence of iron deficiency anemia in infants in China was higher. According to the "Prevalence investigation of iron deficiency in children in China", which was published on *Chinese Journal of Pediatrics* in 2008, overall prevalence of iron deficiency in children aged 7 months to 7 years was 40.3%, and the prevalence of iron deficiency anemia was 7.8%. Among them, the prevalence of iron deficiency and iron deficiency anemia in infants was as high as 44.7% and 20.5%, respectively. The prevalence of anemia in artificially fed babies was almost twice as high as that in breast-fed babies.

Iron deficiency anemia would affect behavior and intellectual development of infants, thereby decreasing the visual and auditory developmental level as well as the learning ability; pica appeared in some infants, such as those who like eating soil block, chalk and other abnormal matters. In addition, when the infants had iron deficiency, the number of brain cells in infants would be reduced or the functions thereof would be lowered, and anemia would lead to insufficient oxygen being carried, as well as hypoxia in cells of brain and other organs, such that iron deficiency might affect mental development of children. Therefore, alleviating the infant iron deficiency has become one of the major nutrition researches in the world.

As well known, babies with exclusive breast-feeding suffer fewer anemia. Breast milk contains various kinds of nutrients required in infants for growth and development. Although breast milk contains a small amount of iron, it is enough for the baby requirements because of the high absorption rate of iron therein. The absorption rate of iron in breast milk (50-75%) is much higher than that in milk powder provided with the enhanced iron (about 4%).

The iron supplementing compound commonly used in the commercially-available infant formula milk powder is non-heme iron, but the absorption rate of non-heme iron is only 2.57%. Although in the case of the iron deficiency in body, the absorption of rate will be slightly increased, but it is still too low. According to the investigation, it is found that the intake of dietary iron in crowd is usually higher than RDA (AI), but the phenomenon of iron deficiency in body, including iron deficiency anemia and hemoglobin being lower than normal level is very common, this is mainly because the formula milk powder and other complementary food comprise phosphates, carbonates, phytic acid, oxalic acid, tannic acid and the like, which can form insoluble salts with iron, and affect the absorption of iron. Even a small amount of the above compounds exist, the inhibition of iron absorption is quite significant. In addition, the milk powder comprises some inhibiting components in a high concentration (such as calcium and phosphate), and lacks iron-absorption enhancing components (such as vitamin C, lactose, lactoferrin and the like), or the proportion of each component is inappropriate.

Although some formula milk powder manufacturers have started to pay attention to problems of infant iron deficiency or anemia, most of them intend to solve the infant iron-absorption insufficiency by increasing the addition amount of iron or excessively increasing the addition amount of vitamin C. On one hand, excessive iron will lead to the imbalanced metabolism of zinc, copper and other trace elements in the body, resulting in loss of appetite, anorexia, growth retardation, low blood pressure, abnormal cholesterol in infants, thereby increasing the risk of inducing heart disease; on the other hand, excess iron deposition may result in the body aging and the occurrence of various epidemic diseases, thereby leading to body injury; furthermore, excess vitamin C will cause the instability in quality of milk powder, and the acidity thereof will be too high after being brewed, resulting in the destruction of other nutrients, etc. Therefore, none of them can improve the current situation of infant iron deficiency.

SUMMARY OF THE INVENTION

The purpose of the present invention is to provide an infant formula milk powder as well as the preparation method thereof, in order to prevent and alleviate infant iron deficiency anemia.

The present invention is achieved by the following technical solutions:

The present invention provides an infant formula milk powder, comprising the following components (parts by weight): 5-20 parts of vegetable oil, 187-427 parts of fresh milk (containing 11.1% of dry matter), 20-35 parts of whey powder, 12.23-21.753 parts of lactose, 2-4 parts of whey protein powder, 1.5-2.5 parts of oligosaccharides, 0.15-0.2 part of complex vitamins, 0.35-0.6 part of complex minerals, 1-1.5 parts of other nutrients allowed in the infant formula milk powder, 0.02-0.1 part of lactoferrin, and vitamin C, wherein the mass ratio of lactoferrin to vitamin C is 1:3 to 1:1.

The present invention provides an infant formula milk powder, comprising the following components (parts by weight): 25-35 parts of vegetable fat powder, 30-42.5 parts of powdered milk, 21.5-30 parts of whey powder, 1.096-8.93 parts of solid glucose syrup, 2-4 parts of whey protein powder, 1.5-2.5 parts of oligosaccharides, 0.15-0.2 part of complex vitamins, 0.35-0.6 part of complex minerals, 1-1.5 parts of other nutrients allowed in the infant formula milk powder, 0.02-0.1 part of lactoferrin and, vitamin C, wherein the mass ratio of lactoferrin to vitamin C is 1:3 to 1:1.

As a preferred embodiment, the complex minerals in the infant formula milk powder contain iron source, and the mass ratio of iron source (calculated as iron):lactoferrin:vitamin C is 1:10:25 to 1:8:10.

As a further preferred embodiment, the mass ratio of iron source (calculated as iron):lactoferrin:vitamin C is 1:10:15.

As an even further preferred embodiment, the amount of iron source (calculated as iron) added in 100 parts of infant formula milk powder is 0.004-0.008 part.

As another preferred embodiment, $Fe^{2+}:Fe^{3+}$ comprised in the iron source is 2:3 (by mol).

The present invention provides a method for preparing the infant formula milk powder, comprising the following steps:
(1) mixing and stirring the vegetable oil, fresh milk, whey powder, lactose, whey protein, oligosaccharide until completely dissolved, to prepare a mixed solution, of which the temperature is 40-50° C.;
(2) homogenizing the mixed solution using a high pressure homogenizer at 15-20 MPa, while the temperature is controlled at 40-50° C.;
(3) cooling the mixed solution to 10° C. or lower, and temporarily storing for no more than 12 hours;
(4) concentrating and spray-drying the mixed solution to obtain a powdery matrix powder, wherein during the spray-drying process, the inlet air temperature is 150-170° C., and the outlet air temperature is 80-90° C.;
(5) adding the complex vitamins, the complex minerals, the lactoferrin and the nutrients, and mixing evenly;
(6) packaging.

As a preferred preparation method, during the mixing process in the above step (5), the iron source is further added according to the above-said proportion.

The preset invention provides another method for preparing the infant formula milk powder, comprising the following steps:
(1) mixing the complex vitamins, the complex minerals, the lactoferrin, said other nutrients and an appropriate amount of powdered milk in a mixer for 10-15 min, to obtain a mixture;
(2) adding the rest of raw materials, mixing for 20 min, to obtain a mixture;
(3) packaging.

The present invention has at least the following advantages:

The formula milk powder comprises an appropriate amount of vitamin C and lactoferrin, as well as an appropriate amount of iron source as further provided, and the three are combined according to an appropriate proportion, so that the three substances have a synergistic effect, and the absorption and utilization rate of iron are increased dramatically, thereby not only achieving the desirable iron supplementation effect, but also preventing and alleviating the phenomenon of infant iron deficiency anemia.

It should be emphasized that the vitamin C, iron compound (iron source) and lactoferrin added in the present invention is a synergistic combination, which is in the best proportion range obtained after tremendous trial and verification, and the effect thereof is not the simple sum-up of each single substance, but the synergistic combination thereof.

DETAILED DESCRIPTION

Example 1

An infant formula milk powder, comprising the following components (parts by weight): 20 parts of vegetable oil, 187 parts of fresh milk (containing 11.1% of dry matter), 35 parts of whey powder, 4 parts of whey protein powder, 16.173 parts of lactose, 2.5 parts of oligosaccharides, 0.35 part of complex minerals, 0.14 part of complex vitamins (except vitamin C), 1 part of nutrients, 0.02 part of lactoferrin and 0.06 part of vitamin C.

The preparation method of the above infant formula milk powder was achieved by the following steps:
(1) stirring the vegetable oil, fresh milk (containing 11.1% of dry matter), whey powder, lactose, whey protein powder, oligosaccharide until completely dissolved, to prepare a mixed solution, of which the temperature was controlled at 40° C.;
(2) homogenizing the above mixed solution using a high pressure homogenizer at 20 MPa, while the temperature was controlled at 50° C.;
(3) cooling the mixed solution to 10° C. or lower, and temporarily storing for 12 hours;
(4) concentrating and spray-drying the mixed solution to obtain a powdery matrix powder, wherein during the spray-drying process, the inlet air temperature was 150° C., and the outlet air temperature was 90° C.;
(5) adding complex vitamins, complex minerals, lactoferrin, vitamin C and nutrients, and mixing evenly;
(6) packaging, to obtain the final products.

Example 2

An infant formula milk powder, comprising the following components (parts by weight): 5 parts of vegetable oil, 427 parts of fresh milk (containing 11.1% of dry matter), 20 parts of whey powder, 2 parts of whey protein powder, 21.753 parts of lactose, 1.5 parts of oligosaccharides, 0.567 part of complex minerals (except iron), 0.05 part of complex vitamins (except vitamin C), 1.5 parts of nutrients, 0.033 part of ferrous gluconate (containing 12% of iron), 0.10 part of lactoferrin and 0.10 part of vitamin C.

The preparation method of the above infant formula milk powder was achieved by the following steps:
(1) stirring the vegetable oil, fresh milk (containing 11.1% of dry matter), whey powder, lactose, whey protein powder, oligosaccharide until completely dissolved, to prepare a mixed solution, of which the temperature was 50° C.;
(2) homogenizing the above mixed solution using a high pressure homogenizer at 15 MPa, while the temperature was controlled at 40° C.;
(3) cooling the mixed solution to 10° C. or lower, and temporarily storing for 11 hours;
(4) concentrating and spray-drying the mixed solution to obtain a powdery matrix powder, wherein during the spray-drying process, the inlet air temperature was 170° C., and the outlet air temperature was 80° C.;
(5) adding complex vitamins, complex minerals, lactoferrin, ferrous gluconate (containing 12% of iron), vitamin C and nutrients, and mixing evenly;
(6) packaging, to obtain the final products.

Animal Experiment for Alleviating Iron Deficiency Anemia

Experimental animals: experimental SD rats, weighted 180-210 g, male and female each in half, were taken for the blood before modeling, to measure the normal value of blood cell. 5 male rats and 5 female rats were kept as the normal control, which were fed with ordinary feedstuff, while the other rats were used for preparing the iron deficiency anemia model. Preparation of the iron deficiency anemia model: the rats were fed with low-iron feedstuff, and accompanied by having the tail bleed once every 5 days, the amount of blood was 0.4 ml each time. Equal numbers of male rats and female rats were separately arranged in plastic cages covered with stainless steel mesh, and took food freely. After 20 days, blood was taken from all modeling animals, and Hb and iron contents in whole blood were measured. 40 modeling animals (male and female each in half) with Hb below 90 g/L were taken, and randomly divided into four groups: the control group, the sample group 1 (lacking lactoferrin), the sample group 2 (lacking vitamin C) and the sample group 3, n=10.

Experimental method: rats were fed once a day with the amount of 15% of body weight thereof, freely drank distilled water and ate ordinary feedstuff for 30 days. Hb and RBC contents in blood of animals in each group were recorded before modeling, after modeling and after feeding; the control group was fed with ordinary feedstuff; the model control group was still fed with low-iron feedstuff; the sample group 1 was fed with the formula milk powder according to this example but without lactoferrin; the sample group 2 was fed with the formula milk powder according to this example but without vitamin C; the sample group 3 was fed with the formula milk powder according to this example.

Results:

TABLE 1

Measurement results of RBC and Hb before modeling, after modeling and after feeding ($\bar{x} \pm s$)

| group | RBC ($*10^{12}$/L) | | | Hb (g/L) | | |
|---|---|---|---|---|---|---|
| | before modeling | after modeling | after feeding | before modeling | after modeling | after feeding |
| Normal control group | 6.36 ± 0.40 | 6.4 ± 0.41 | 6.42 ± 0.45 | 122.7 ± 6.6 | 121.5 ± 4.9 | 122.5 ± 5.6 |
| model group | 6.39 ± 0.39 | 5.1 ± 0.43 | 5.18 ± 0.45 | 121.5 ± 7.6 | 77.5 ± 5.5 | 76.5 ± 5.9 |
| sample group 1 | 6.40 ± 0.41 | 5.4 ± 0.45 | 6.89 ± 0.52* | 122.5 ± 7.1 | 79.0 ± 6.1 | 122.8 ± 5.5* |
| sample group 2 | 6.35 ± 0.42 | 5.3 ± 0.42 | 7.02 ± 0.49* | 121.5 ± 6.2 | 78.7 ± 6.2 | 123.5 ± 5.1* |
| sample group 3 | 6.38 ± 0.41 | 5.3 ± 0.44 | 7.30 ± 0.51** | 123.9 ± 6.7 | 79.1 ± 6.5 | 138.1 ± 5.3** |

Note:
*indicates that compared with the model group, P < 0.05;
**indicates that compared with the sample groups 1 and 2, P < 0.05

From the results in Table 1, it can be known that after feeding the modeling animals with different samples for 3 weeks, the recovery of RBC and Hb of rats in sample groups 1, 2 and 3 were evidently enhanced with a significant difference, compared to that in the control group; and said recovery of rats in sample group 3 also had a significant difference compared to that in sample groups 1 and 2. This illustrates that with regard to the effect for alleviating the iron deficiency anemia, the formula milk powder comprising lactoferrin and vitamin C in a certain proportion was better than the formula milk powder provided with lactoferrin or vitamin C alone.

Example 3

An infant formula milk powder, comprising the following components (parts by weight): 6 parts of vegetable oil, 400 parts of fresh milk (containing 11.1% of dry matter), 22 parts of whey powder, 3 parts of whey protein powder, 21.699 parts of lactose, 1.8 parts of oligosaccharides, 0.5 part of complex minerals (except iron), 0.075 part of complex vitamins (except vitamin C), 1.5 parts of nutrients, 0.10 part of lactoferrin, 0.125 part of vitamin C and 0.104 part of ferrous gluconate (containing 12% of iron).

The preparation method of the above infant formula milk powder was achieved by the following steps:

(1) stirring the vegetable oil, fresh milk (containing 11.1% of dry matter), whey powder, lactose, whey protein powder, oligosaccharide until completely dissolved, to prepare a mixed solution, of which the temperature was 45° C.;

(2) homogenizing the above mixed solution using a high pressure homogenizer at 18 MPa, while the temperature was controlled at 45° C.;

(3) cooling the mixed solution to 10° C. or lower, and temporarily storing for no more than 12 hours;

(4) concentrating and spray-drying the mixed solution to obtain a powdery matrix powder, wherein during the spray-drying process, the inlet air temperature was 160° C., and the outlet air temperature was 85° C.;

(5) adding complex vitamins (except vitamin C), complex minerals (except iron), vitamin C, ferrous gluconate (containing 12% of iron), lactoferrin and the nutrients, and mixing evenly;

(6) packaging, to obtain the final products.

Clinical Experiment for Alleviating Iron Deficiency Anemia

Experimental subjects: 90 cases of children patients with iron deficiency anemia diagnosed clinically were chosen by using random-sampling grouping method, and divided into 3 groups (common diet, the ordinary formula milk powder, the formula milk powder of Example 3), n=30. The children patients were 0.5-1.5 years old, and the difference of clinical information of the children patients in three groups had no statistical significance (P>0.05).

Method: group 1 was fed with common diet; group 2 was fed with the formula milk powder in other brands (prepared by wet process); group 3 was fed with the formula milk powder prepared by this example. The Hb of the children patients in the three groups were measured after two months, to evaluate the alleviating effects (when the hemoglobin was increased and the average increase was >15 g/L, it was judged as effective), and contrastively analyze the adverse reaction rates.

Results: clinical information and data of children patients were analyzed by using statistical software, and it was considered as statistically significant when P<0.05. As seen from Table 2, the anemia symptoms of the children patients with anemia cannot be changed by common diet, the effect of alleviating the symptoms of iron deficiency anemia in children patients in group 3 was better than that in children patients in the other two groups, and the difference thereof was statistically significant (P<0.05); the alleviating effect of the formula milk powder of this example was better than that of the ordinary formula milk powder, and the difference therebetween was statistically significant (P<0.05); adverse reaction rate of the children patients in the three group was 0.0%, 3.3% and 3.3%, respectively, and the difference thereof was not statistically significant (P>0.05). See Table 2 and Table 3.

TABLE 2

Comparison of the treatment effects [n (%)]

| Group | number of cases (n) | Hb (g/L) Before feeding | Hb (g/L) After feeding | Overall effective | Ineffective |
|---|---|---|---|---|---|
| Group 1 | 30 | 93.7 ± 5.2 | 91.7 ± 4.5 | 4 | 26 |
| Group 2 | 30 | 93.5 ± 5.6 | 103.5 ± 5.2* | 14* | 16 |
| Group 3 | 30 | 93.4 ± 5.8 | 123.2 ± 5.1** | 23** | 7 |

Note:
*indicates that compared with the control group, P < 0.05;
**indicates that compared with groups 1 and 2, P < 0.05

TABLE 3

Comparison of adverse reactions [n (%)]

| Group | number of cases (n) | emesis | diarrhea | constipation | poor appetite | allergy |
|---|---|---|---|---|---|---|
| Group 1 | 30 | 0 | 0 | 0 | 0 | 0 |
| Group 2 | 30 | 0 | 0 | 0 | 1 | 0 |
| Group 3 | 30 | 0 | 0 | 1 | 0 | 0 |

Note:
P > 0.05

Example 4

An infant formula milk powder, comprising the following components (parts by weight): 10 parts of vegetable oil, 325 parts of fresh milk (containing 11.1% of dry matter), 28 parts of whey powder, 3 parts of whey protein powder, 18.827 parts of lactose, 2.0 parts of oligosaccharides, 0.52 part of complex minerals, 0.014 part of complex vitamins (except vitamin C), 1.3 parts of nutrients, 0.088 part of lactoferrin, 0.176 part of vitamin C The preparation method of the above infant formula milk powder was the same with that in Example 1.

Example 5

An infant formula milk powder, comprising the following components (parts by weight): 10 parts of vegetable oil, 325 parts of fresh milk (containing 11.1% of dry matter), 28 parts of whey powder, 3 parts of whey protein powder, 18.822 parts of lactose, 2.0 parts of oligosaccharides, 0.48 part of complex minerals (except iron), 0.013 part of complex vitamins (except vitamin C), 1.3 parts of nutrients, 0.10 part of lactoferrin, 0.167 part of vitamin C, 0.043 part of ferrous lactate (containing 19.4% of iron).

The preparation method of the above infant formula milk powder was almost the same with that in Example 2, except for in step (5), adding complex vitamins, complex minerals, lactoferrin, ferrous lactate (containing 19.4% of iron), vitamin C and nutrients, and mixing evenly.

Example 6

An infant formula milk powder, comprising the following components (parts by weight): 12 parts of vegetable oil, 350 parts of fresh milk (containing 11.1% of dry matter), 30 parts of whey powder, 3 parts of whey protein powder, 12.23 parts of lactose, 2.0 parts of oligosaccharides, 0.475 part of complex minerals (except iron), 0.045 part of complex vitamins (except vitamin C), 1.2 parts of nutrients, 0.025 part of ferrous sulfate (containing 20% of iron), 0.05 part of lactoferrin, 0.125 part of vitamin C.

The preparation method of the above infant formula milk powder was almost the same with that in Example 5, except for in step (5), adding complex vitamins, complex minerals, lactoferrin, ferrous sulfate (containing 20% of iron), vitamin C and nutrients, and mixing evenly.

Example 7

An infant formula milk powder, comprising the following components (parts by weight): 12 parts of vegetable oil, 350 parts of fresh milk (containing 11.1% of dry matter), 30 parts of whey powder, 3 parts of whey protein powder, 12.2 parts of lactose, 2.0 parts of oligosaccharides, 0.475 part of complex minerals (except iron), 0.095 part of complex vitamins (except vitamin C), 1.2 parts of nutrients, 0.03 part of ferrous sulfate (containing 20% of iron), 0.06 part of lactoferrin and 0.09 part of vitamin C The preparation method of the above infant formula milk powder was the same with the steps in Example 6.

Example 8

An infant formula milk powder, comprising the following components (parts by weight): 30 parts of vegetable fat powder, 40 parts of skim powdered milk, 13 parts of whey powder, 4 parts of whey protein powder, 8.93 parts of liquid glucose syrup, 2.5 parts of oligosaccharides, 0.35 part of complex minerals, 0.14 part of complex vitamins (except vitamin C), 1 part of nutrients, 0.02 part of lactoferrin, and 0.06 part of vitamin C The preparation method of the above infant formula milk powder was achieved by the following steps:
(1) mixing the complex vitamins (except vitamin C), complex minerals, lactoferrin, other nutrients and an appropriate amount of powdered milk in a mixer for 10 min, to obtain a mixture;
(2) adding the rest of raw materials, mixing for 20 min, to obtain a mixture;
(3) packaging.

Animal Experiment for Alleviating Iron Deficiency Anemia

The iron-deficiency animal model was prepared according to the animal experiment research scheme and method of Example 2, 40 modeling animals (male and female each in half) with Hb below 90 g/L were taken, and randomly divided into four groups: the model control group, the sample group 1 (lacking lactoferrin), the sample group 2 (lacking vitamin C) and the sample group 3 (this example), n=10.

Experimental method: rats were fed once a day with the amount of 15% of body weight thereof, freely drank distilled water and ate ordinary feedstuff for 30 days. Hb and RBC contents in blood of animals in each group were recorded before modeling, after modeling and after feeding; the model control group was still fed with low-iron feedstuff; the sample group 1 was fed with the formula milk powder according to this example but without lactoferrin; the sample group 2 was fed with the formula milk powder according to this example but without vitamin C; the sample group 3 was fed with the formula milk powder according to this example.

Results:

TABLE 4

Measurement results of RBC and Hb before modeling, after modeling and after feeding ($\bar{x} \pm s$)

| group | RBC (*$10^{12}$/L) | | | Hb (g/L) | | |
|---|---|---|---|---|---|---|
| | before modeling | after modeling | after feeding | before modeling | after modeling | after feeding |
| model group | 6.54 ± 0.40 | 5.6 ± 0.45 | 5.85 ± 0.45 | 127.5 ± 11.0 | 78.5 ± 5.8 | 79.5 ± 9.8 |
| sample group 1 | 6.54 ± 0.39 | 5.5 ± 0.49 | 6.92 ± 0.50* | 127.5 ± 11.0 | 78.0 ± 7.1 | 132.8 ± 9.3* |
| sample group 2 | 6.55 ± 0.41 | 5.2 ± 0.51 | 7.10 ± 0.52* | 126.5 ± 11.2 | 78.5 ± 7.2 | 133.5 ± 9.1* |
| sample group 3 | 6.52 ± 0.42 | 5.4 ± 0.46 | 7.29 ± 0.53** | 126.9 ± 10.9 | 78.3 ± 7.5 | 145.1 ± 9.5** |

Note:
*indicates that compared with the control group, P < 0.05;
**indicates that compared with the sample groups 1 and 2, P < 0.05

From the results in Table 4, it can be known that after feeding the modeling animals with different samples for 30 days, the recovery of RBC and Hb of rats in sample groups 1, 2 and 3 were evidently enhanced with a significant difference compared to that in the control group, and higher than that in the control group; said recovery of rats in sample group 3 also had a significant difference compared to that in sample groups 1 and 2. This illustrates that with regard to the effect for promoting iron absorption, the formula milk powder comprising the iron-absorption enhancing compositions was significantly better than the formula milk powder provided with lactoferrin or vitamin C alone.

Example 9

An infant formula milk powder, comprising the following components (parts by weight): 25 parts of vegetable fat powder, 28 parts of skim powdered milk, 14.5 parts of whole powdered milk, 21.5 parts of whey powder, 2 parts of whey protein powder, 1.5 parts of oligosaccharides, 5.15 parts of solid glucose syrup, 0.567 part of complex minerals (except iron), 0.05 part of complex vitamins (except vitamin C), 1.5 parts of nutrients, 0.10 part of lactoferrin, 0.10 part of vitamin C and 0.033 part of ferrous gluconate (containing 12% of iron).

The preparation method of the above infant formula milk powder was achieved by the following steps:
(1) mixing the complex vitamins, complex minerals, lactoferrin, other nutrients and an appropriate amount of powdered milk in a mixer for 15 min, to obtain a mixture;
(2) adding the rest of raw materials, mixing for 20 min, to obtain a mixture;
(3) packaging.

Example 10

An infant formula milk powder, comprising the following components (by weight): 35 parts of vegetable fat powder (containing 45% of lactose), 30 parts of skim powdered milk, 26 parts of whey powder, 3 parts of whey protein powder, 2.5 parts of oligosaccharides, 1.096 parts of solid glucose syrup, 0.5 part of complex minerals (except iron), 0.075 part of complex vitamins (except vitamin C), 1.5 parts of nutrients, 0.10 part of lactoferrin, 0.125 part of vitamin C and 0.104 part of ferrous gluconate (containing 12% of iron).

The preparation method of the above infant formula milk powder was achieved by the following steps:
(1) mixing the complex vitamins (except vitamin C), complex minerals (except iron), lactoferrin, other nutrients and an appropriate amount of powdered milk in a mixer for 12 min, to obtain a mixture;
(2) adding the rest of raw materials, mixing for 20 min, to obtain a mixture;
(3) packaging.

Example 11

An infant formula milk powder, comprising the following components (parts by weight): 35 parts of vegetable fat powder, 30 parts of skim powdered milk, 26 parts of whey powder, 3 parts of whey protein powder, 1.5 parts of oligosaccharides, 2.402 parts of solid glucose syrup, 0.52 part of complex minerals, 0.014 part of complex vitamins (except vitamin C), 1.3 parts of nutrients, 0.088 part of lactoferrin and 0.176 part of vitamin C.

The preparation method of the above infant formula milk powder was the same with the steps in Example 8.

Example 12

An infant formula milk powder, comprising the following components (parts by weight): 25 parts of vegetable fat powder, 28 parts of skim powdered milk, 21.5 parts of whey powder, 14.5 parts of whole powdered milk, 2 parts of whey protein powder, 2.0 parts of oligosaccharides, 4.897 parts of solid glucose syrup, 0.48 part of complex minerals (except iron), 0.013 part of complex vitamins (except vitamin C), 1.3 parts of nutrients, 0.10 part of lactoferrin, 0.167 part of vitamin C and 0.043 part of ferrous lactate (containing 19.4% of iron).

The preparation method of the above infant formula milk powder was achieved by the following steps:
(1) mixing the complex vitamins (except vitamin C), complex minerals (except iron), lactoferrin, other nutrients and an appropriate amount of powdered milk in a mixer for 10 min, to obtain a mixture;
(2) adding the rest of raw materials, mixing for 20 min, to obtain a mixture;
(3) packaging.

Example 13

An infant formula milk powder, comprising the following components (parts by weight): 28 parts of vegetable fat powder, 30 parts of whole powdered milk, 30 parts of whey powder, 4 parts of whey protein powder, 4.08 parts of solid glucose syrup, 2.0 parts of oligosaccharides, 0.475 part of complex minerals (except iron), 0.045 part of complex vitamins (except vitamin C), 1.2 parts of nutrients, 0.025 part of ferrous sulfate (containing 20% of iron), 0.05 part of lactoferrin and 0.125 part of vitamin C.

The preparation method of the above infant formula milk powder was achieved by the following steps:
(1) mixing the complex vitamins (except vitamin C), complex minerals (except iron), lactoferrin, other nutrients and an appropriate amount of milk powder in a mixer for 15 min, to obtain a mixture;
(2) adding the rest of raw materials, mixing for 20 min, to obtain a mixture;
(3) packaging.

Clinical Experiment for Alleviating Iron Deficiency Anemia

Experimental subjects: 60 cases of children patients with iron deficiency anemia diagnosed clinically were chosen by using random-sampling grouping method, and divided into 3 groups (common diet, other formula milk powder, the formula milk powder of this example), n=20. The children patients were 1-3 years old, and the difference of clinical information of the children patient in three groups had no statistical significance (P>0.05).

Method: group 1 was fed with common diet; group 2 was fed with the formula milk powder in other brands (prepared by dry process); group 3 was fed with the formula milk powder prepared by this example. The Hb of the children patients in the three groups were measured after two months, to evaluate the alleviating effects (when the hemoglobin was increased and the average increase was ≥15 g/L, it was judged as effective), and contrastively analyze the adverse reaction rates.

Results: clinical information and data of children patients were analyzed by using statistical software, and it was considered as statistically significant when P<0.05. It can be seen from the following Table 5 that, the effects of the two formula milk powders were better than that of the common diet group, and the effect of alleviating the symptoms of iron deficiency anemia in children patients in group 3 was better than that in children patients in the other two groups, and the difference thereof was statistically significant; the alleviating effect of the formula milk powder of this example was better than that of the formula milk powder in other brands, and the difference therebetween was statistically significant (P<0.05); the adverse reaction rate of the children patients in the three group was 0.0%, 5.0% and 5.0%, respectively, and the difference thereof was not statistically significant (P>0.05). See Table 5 and Table 6.

TABLE 5

Comparison of the treatment effects [n (%)]

| Group | number of cases (n) | Hb (g/L) Before feeding | Hb (g/L) After feeding | Overall effective | Ineffective |
|---|---|---|---|---|---|
| Group 1 | 20 | 90.5 ± 4.6 | 93.2 ± 4.6 | 5 | 15 |
| Group 2 | 20 | 91.2 ± 4.5 | 107.4 ± 4.8* | 11* | 9 |
| Group 3 | 20 | 91.3 ± 4.7 | 129.1 ± 5.0** | 17** | 3 |

Note:
*indicates that compared with the control group, P < 0.05;
**indicates that compared with the groups 1 and 2, P < 0.05

TABLE 6

Comparison of adverse reactions [n (%)]

| Group | number of cases (n) | emesis | diarrhea | constipation | poor appetite | allergy |
|---|---|---|---|---|---|---|
| Group 1 | 30 | 0 | 0 | 0 | 0 | 0 |
| Group 2 | 30 | 0 | 0 | 0 | 1 | 0 |
| Group 3 | 30 | 0 | 0 | 1 | 0 | 0 |

Note:
P > 0.05

Example 14

An infant formula milk powder, comprising the following components (parts by weight): 35 parts of vegetable fat powder, 30 parts of skim powdered milk, 26 parts of whey powder, 3 parts of whey protein powder, 1.5 parts of oligosaccharides, 2.893 parts of solid glucose syrup, 0.34 part of complex minerals (except iron), 0.065 part of complex vitamins (except vitamin C), 1 part of nutrients, 0.01 part of ferrous sulfate (containing 20% of iron), 0.012 part of ferric pyrophosphate (containing 25% of iron), 0.045 part of lactoferrin and 0.135 part of vitamin C.

The preparation method of the above infant formula milk powder was achieved by the following steps:
(1) mixing the complex vitamins (except vitamin C), complex minerals (except iron), lactoferrin, other nutrients and an appropriate amount of powdered milk in a mixer for 13 min, to obtain a mixture;
(2) adding the rest of raw materials, mixing for 20 min, to obtain a mixture;
(3) packaging.

Example 15

An infant formula milk powder, comprising the following components (parts by weight): 25 parts of vegetable fat powder, 28 parts of skim powdered milk, 21.5 parts of whey powder, 14.5 parts of whole powdered milk, 2 parts of whey protein powder, 2.5 parts of oligosaccharides, 2.276 parts of solid glucose syrup, 0.45 part of complex minerals (except iron), 0.1 part of complex vitamins (except vitamin C), 1 part of nutrients, 0.024 part of ferric pyrophosphate (containing 25% of iron), 0.09 part of vitamin C and 0.06 part of lactoferrin.

The complex minerals of the present invention comprise calcium carbonate, zinc sulfate, potassium iodide, copper sulfate, sodium selenite, manganese sulfate, and maltodextrin. The complex vitamins of the present invention comprise vitamin A, vitamin D, vitamin E, vitamin K1, vitamin B1, vitamin B2, vitamin B6, vitamin B12, pantothenic acid, biotin, folic acid, nicotinic acid, taurine and a small amount of maltodextrin. The nutrients of the present invention comprise DHA, AA, lutein, nucleotide and maltodextrin.

As described in the Example 15, the amount of complex minerals (0.4 part of calcium carbonate, 0.011 part of zinc sulphate, 0.000072 part of potassium iodide, 0.0012 part of copper sulfate, 0.000024 part of sodium selenite, 0.00012 part of manganese sulfate and balance maltodextrin) was 0.45 part; the amount of complex vitamins (0.0005 part of vitamin A, 0.000009 part of vitamin D, 0.005 part of vitamin E, 0.000055 part of vitamin K1, 0.00045 part of vitamin B1, 0.0009 part of vitamin B2, 0.0003 part of vitamin B6, 0.000002 part of vitamin B12, 0.003 part of pantothenic acid, 0.00002 part of biotin, 0.00009 part of folic acid, 0.003 part of nicotinic acid, 0.045 part of taurine and balance maltodextrin) was 0.1 part; and the amount of nutrients (0.03 part of DHA, 0.06 part of AA, 0.0003 part of lutein, 0.025 part of nucleotides, and balance maltodextrin) was 1 part.

Obviously, the components comprised in the above complex minerals, vitamins, nutrients can be appropriately adjusted according to the specific circumstances.

The preparation method of the above infant formula milk powder was achieved by the following steps:
(1) mixing the complex vitamins (except vitamin C), complex minerals (except iron), lactoferrin, other nutrients and an appropriate amount of powdered milk in a mixer for 15 min, to obtain a mixture;

and relative absorption rate of iron (RBA) were calculated. BHb-Fe=weight (g)*7%*Hbg %*3.4 (mgFe/gHb), wherein the amount of blood was as 7%, Fe content in Hb was as 3.4 mg/g.

The control group was fed with ordinary feedstuff; the sample group 1 was fed with the formula milk powder according to Example 15 but without lactoferrin and vitamin C; the sample group 2 was fed with the formula milk powder according to Example 15 but without lactoferrin; the sample group 3 was fed with the formula milk powder according to Example 15. The iron contents in the three samples were 6 mg/100 g.

Results:

TABLE 7

Measurement results of RBC and Hb before modeling, after modeling and after feeding ($\bar{x} \pm s$)

| group | RBC (*$10^{12}$/L) | | | Hb (g/L) | | |
|---|---|---|---|---|---|---|
| | before modeling | after modeling | after feeding | before modeling | after modeling | after feeding |
| control group | 6.55 ± 0.40 | 6.6 ± 0.45 | 6.85 ± 0.50 | 127.5 ± 11.0 | 128.5 ± 12.0 | 129.5 ± 11.8 |
| sample group 1 | 6.54 ± 0.39 | 5.1 ± 0.49 | 7.02 ± 0.52 | 126.5 ± 10.6 | 78.0 ± 7.1 | 142.8 ± 11.3 |
| sample group 2 | 6.51 ± 0.41 | 5.0 ± 0.51 | 7.41 ± 0.59* | 127.5 ± 11.2 | 77.5 ± 7.2 | 147.5 ± 12.1* |
| sample group 3 | 6.59 ± 0.42 | 5.1 ± 0.46 | 7.65 ± 0.62** | 126.9 ± 10.9 | 78.0 ± 7.5 | 149.8 ± 12.5** |

Note:
*indicates that compared with the sample group 1, $P < 0.05$;
**indicates that compared with the sample group 2, $P < 0.05$ (2) adding the rest of raw materials, mixing for 20 min, to obtain a mixture;
(3) packaging.

Example 16

Experiment for Alleviating Iron Deficiency Anemia

Experimental animals: experimental SD rats, weighted 180-210 g, male and female each in half, were taken for the blood before modeling, to measure the normal value of blood cell. 5 male rats and 5 female rats were kept as the normal control, which were fed with ordinary feedstuff, while the other rats were used for preparing the iron deficiency anemia model. Preparation of the iron deficiency anemia model: the rats were fed with low-iron feedstuff, and accompanied by having the tail bleed once every 3 days, the amount of blood was 120 drops/kg each time for 4 times. Equal numbers of male rats and female rats were separately arranged in plastic cages covered with stainless steel mesh, and took food freely. After 20 days, blood were taken from all modeling animals, and Hb and iron contents in whole blood were measured. 40 modeling animals (male and female each in half) with Hb below 90 g/L, and iron contents in whole blood below 430 ng/ml were taken, and randomly divided into four groups: the control group, the sample group 1 (iron), the sample group 2 (vitamin C+iron) and the sample group 3 (vitamin C+iron+lactoferrin), n=10.

Experimental method: rats were fed once a day with the amount of 15% of body weight thereof, freely drank distilled water for 21 days. Hb and RBC contents in blood of animals in each group were recorded before modeling, after modeling and after feeding; iron contents in whole blood of animals in all groups were measured by using atomic absorption spectrometry, and the total iron content in hemoglobin (BHb-Fe)

TABLE 8

The relative bioavailability of iron (RBA %) ($\bar{x} \pm s$)

| group | BHb-Fe (mg) Before feeding | BHb-Fe (mg) After feeding | BHb-Fe (mg) Increased | RBA % |
|---|---|---|---|---|
| sample group 1 | 3.68 ± 0.37 | 6.75 ± 0.62 | 3.07 ± 0.50 | 100 |
| sample group 2 | 3.65 ± 0.35 | 6.94 ± 0.69* | 3.29 ± 0.49 | 107 |
| sample group 3 | 3.74 ± 0.38 | 7.18 ± 0.72** | 3.44 ± 0.53 | 112 |

Note:
*indicates that compared with the sample group 1, $P < 0.05$;
**indicates that compared with the sample group 2, $P < 0.05$ From the results in Tables 7 and 8, it can be known that after feeding the modeling animals with the samples comprising the same amount of iron for 3 weeks, the recovery of RBC and Hb of rats in sample groups 2 and 3 were evidently enhanced with a significant difference compared to that in control group and sample group 1, and higher than that in the control group, while the absorption and utilization rate of iron were improved; said effects in sample group 2 also had a significant difference compared to that in sample group 1, and said effects in sample group 3 also had a significant difference compared to that in sample groups 1 and 2. This illustrates that with regard to the effect for promoting iron absorption, the formula milk powder comprising the iron-absorption enhancing compositions was significantly better than the formula milk powder added with iron or vitamin C alone.

Finally, it should be noted that, the part according to the present invention was all calculated by weight. The components comprised in complex minerals, vitamins and nutrients can be appropriately adjusted according to actual requirements. In addition, the complex minerals can comprise the iron source directly, alternatively, the iron source can be additionally added; the complex vitamins can comprise the vitamin C directly, alternatively, the vitamin C can be additionally added. Regardless which way is to be used, the mass ratio between lactoferrin and vitamin C, as well as the mass ratio of iron source (calculated as iron), lactoferrin and vitamin C must satisfy the ratio relationship pointed out by the present invention.

Certainly, the components listed above are only the specific examples of the present invention. Obviously, the present invention is not limited into the above examples, but can have many variations. All variations that can be derived from or associated directly with the contents disclosed in the present invention by one of ordinary skill in the art should be considered as falling within the scope of the present invention.

The invention claimed is:

1. An infant formula milk powder, comprising the following components, parts by weight: 5-20 parts of vegetable oil, 11.1% of dry matter derived from 187-427 parts of fresh milk, 20-35 parts of whey powder, 12.23-21.753 parts of lactose, 2-4 parts of whey protein powder, 1.5-2.5 parts of oligosaccharides, 0.15-0.2 parts of complex vitamins, 0.35-0.6 parts of complex minerals, 0.02-0.1 parts of lactoferrin, and vitamin C, wherein the mass ratio of lactoferrin to vitamin C is 1:3 to 1:1, wherein the complex minerals contain iron source, and wherein the mass ratio of iron source calculated as iron to lactoferrin to vitamin C is 1:10:25 to 1:8:10.

2. The infant formula milk powder according to claim 1, wherein the mass ratio of iron source calculated as iron to lactoferrin to vitamin C is 1:10:15.

3. The infant formula milk powder according to claim 2, wherein $Fe^{2+}:Fe^{3+}$ comprised in the iron source is 2:3, by mol.

4. The infant formula milk powder according to claim 1, wherein the amount of iron source calculated as iron added in 100 parts of the infant formula milk powder is 0.004-0.008 part.

5. The infant formula milk powder according to claim 4, wherein the iron source is at least one of ferrous gluconate, ferrous lactate, ferrous sulfate, and ferric pyrophosphate.

6. The infant formula milk powder according to claim 1, wherein the iron source is at least one of ferrous gluconate, ferrous lactate, ferrous sulfate, and ferric pyrophosphate.

7. The infant formula milk powder according to claim 1, wherein the milk powder consists of the components of one of the following (a) and (b), parts by weight:
  (a) 5 parts of vegetable oil, 11.1% of dry matter derived from 427 parts of fresh milk, 20 parts of whey powder, 2 parts of whey protein powder, 21.753 parts of lactose, 1.5 parts of oligosaccharides, 0.567 parts of complex minerals except iron, 0.05 parts of complex vitamins except vitamin C, 0.033 parts of ferrous gluconate containing 12% of iron, 0.10 parts of lactoferrin and 0.10 parts of vitamin C; or
  (b) 6 parts of vegetable oil, 11.1% of dry matter derived from 400 parts of fresh milk, 22 parts of whey powder, 3 parts of whey protein powder, 21.699 parts of lactose, 1.8 parts of oligosaccharides, 0.5 parts of complex minerals except iron, 0.075 parts of complex vitamins except vitamin C, 0.10 parts of lactoferrin, 0.125 parts of vitamin C and 0.104 parts of ferrous gluconate containing 12% of iron.

8. The infant formula milk powder according to claim 1, wherein the infant formula milk powder is prepared by a method comprising the following steps:
  mixing and stirring the vegetable oil, fresh milk, whey powder, lactose, whey protein, and oligosaccharide until completely dissolved to prepare a mixed solution, of which the temperature is 40-50° C.;
  homogenizing the mixed solution using a high pressure homogenizer at 15-20 MPa, while the temperature is controlled at 40-50° C.;
  cooling the mixed solution to 10° C. or lower, and temporarily storing the mixed solution for no more than 12 hours;
  concentrating and spray-drying the mixed solution to obtain a powdery matrix powder, wherein during the spray-drying process the inlet air temperature is 150-170° C. and the outlet air temperature is 80-90° C.;
  adding the complex vitamins, the complex minerals, and the lactoferrin, and mixing evenly; and
  packaging the infant formula milk powder.

9. An infant formula milk powder, comprising the following components, parts by weight: 25-35 parts of vegetable fat powder, 30-42.5 parts of powdered milk, 21.5-30 parts of whey powder, 1.096-8.93 parts of solid glucose syrup, 2-4 parts of whey protein powder, 1.5-2.5 parts of oligosaccharides, 0.15-0.2 parts of complex vitamins, 0.35-0.6 parts of complex minerals, 0.02-0.1 parts of lactoferrin, and vitamin C, wherein the mass ratio of lactoferrin to vitamin C is 1:3 to 1:1, wherein the complex minerals contain iron source, and wherein the mass ratio of iron source calculated as iron to lactoferrin to vitamin C is 1:10:25 to 1:8:10.

10. The infant formula milk powder according to claim 9, wherein the infant formula milk powder is prepared by a method comprising the following steps:
  mixing the complex vitamins, the complex minerals, the lactoferrin, and an appropriate amount of powdered milk in a mixer for 10-15 min, to obtain a mixture;
  adding the rest of raw materials, mixing for 20 min, to obtain a mixture; and
  packaging the infant formula milk powder.

11. The infant formula milk powder according to claim 9, wherein the mass ratio of iron source calculated as iron to lactoferrin to vitamin C is 1:10:15.

12. The infant formula milk powder according to claim 11, wherein $Fe2+:Fe3+$ comprised in the iron source is 2:3, by mol.

13. The infant formula milk powder according to claim 9, wherein the amount of iron source calculated as iron added in 100 parts of the infant formula milk powder is 0.004-0.008 part.

14. The infant formula milk powder according to claim 13, wherein the iron source is at least one of ferrous gluconate, ferrous lactate, ferrous sulfate, and ferric pyrophosphate.

15. The infant formula milk powder according to claim 9, wherein the iron source is at least one of ferrous gluconate, ferrous lactate, ferrous sulfate, and ferric pyrophosphate.

16. The infant formula milk powder according to claim 9, wherein the milk powder consists of the components of one of the following (c), (d) and (e), parts by weight:
  (c) 30 parts of vegetable fat powder, 40 parts of skim powdered milk, 13 parts of whey powder, 4 parts of whey protein powder, 8.93 parts of liquid glucose syrup, 2.5 parts of oligosaccharides, 0.35 parts of complex minerals, 0.14 parts of complex vitamins except vitamin C, 0.02 parts of lactoferrin and 0.06 parts of vitamin C;
  (d) 28 parts of vegetable fat powder, 30 parts of whole powdered milk, 30 parts of whey powder, 4 parts of whey protein powder, 4.08 parts of solid glucose syrup, 2.0 parts of oligosaccharides, 0.475 parts of complex minerals except iron, 0.045 parts of complex vitamins except vitamin C, 0.025 parts of ferrous sulfate containing 20% of iron, 0.05 parts of lactoferrin and 0.125 parts of vitamin C; or (e) 25 parts of vegetable fat powder, 28 parts of skim powdered milk, 21.5 parts of whey powder, 14.5 parts of whole powdered milk, 2 parts of whey protein powder, 2.5 parts of oligosaccharides, 2.276 parts of solid glucose syrup, 0.45 parts of complex minerals except iron, 0.1 parts of complex vitamins except vitamin C, 0.024 parts of ferric pyrophosphate containing 25% of iron, 0.09 parts of vitamin C and 0.06 parts of lactoferrin.

* * * * *